United States Patent Office 3,146,568
Patented Sept. 1, 1964

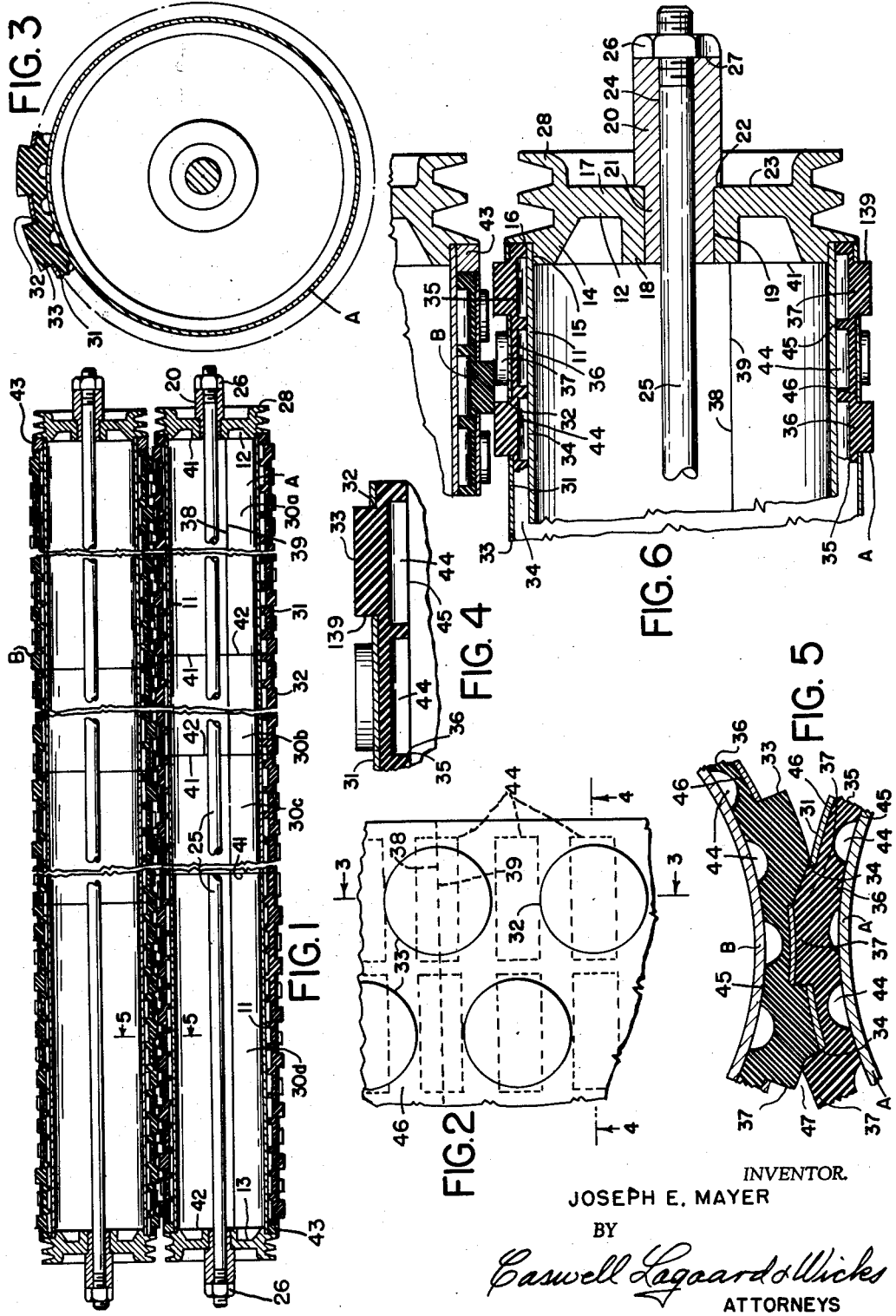

3,146,568
WRINGER ROLL FOR HAY CONDITIONERS
Joseph E. Mayer, 12 Westwood Road, Minneapolis, Minn.
Filed Oct. 19, 1962, Ser. No. 231,693
7 Claims. (Cl. 56—1)

The herein disclosed invention relates to wringer rolls for hay conditioners and has for an object to provide a wringer roll operating on the principle of contusion and which when used in conjunction with another roll and particularly a like roll will produce a hammer action as well as a crushing action to free the juices in the stems of the hay to permit of rapid drying of the hay.

An object of the invention resides in providing a wringer roll which will pass objects such as corn cobs and pebbles without wrecking the rolls.

Another object of the invention resides in providing the wringer means of the roll in separate identical wringer units which may be readily replaced upon injury or undue wear and or which may be transferred to positions on the roll where less wear occurs.

An object of the invention resides in providing the wringer units with a sleeve having a series of openings therein and in providing hammer heads extending through said openings and engageable with the companion roll to contuse the hay passing between the rolls and wring the juices in the hay therefrom.

A still further object of the invention resides in arranging the hammer heads to project outwardly beyond the sleeve to cause the same to readily pick up the hay and deliver it to the bight between the rolls.

An object of the invention resides in constructing the hammer heads of rubber or some other similar flexible material and in providing within the sleeve resilient backing means whereby the hammer heads may be compressed and forced back through the openings to conform to the outer surface of the roll.

Another object of the invention resides in arranging the rolls so that the hammer heads on one roll are staggered in a longitudinal direction with respect to the hammer heads on the companion roll.

A still further object of the invention resides in the particular construction for supporting the various wringer units in operative position relative to one another.

An object of the invention resides in the specific construction of each wringer roll.

Other objects of the invention reside in the novel combination and arrangement of parts and in the details of construction hereinafter illustrated and described.

In the drawings:

FIG. 1 is an elevational longitudinal sectional view of a pair of wringer rolls of a hay conditioner, said view being taken at a plane containing the axes of both of the rolls, and with the rolls running freely.

FIG. 2 is a fragmentary plan view of one of the rolls of the invention drawn to full size.

FIG. 3 is a transverse sectional view of the roll shown in FIG. 2 taken on line 3—3 of FIG. 2 and drawn to a lesser scale than FIG. 2.

FIG. 4 is a fragmentary longitudinal sectional view taken on line 4—4 of FIG. 2 and drawn to the same scale as FIG. 2.

FIG. 5 is a fragmentary transverse sectional view taken on line 5—5 of FIG. 1 and drawn to the same scale as FIG. 2, and with the rolls in operating position.

FIG. 6 is a fragmentary longitudinal sectional view of one end of the wringer rolls similar to FIG. 1 and drawn to a greater scale.

The instant invention relates to the wringer rolls of a hay conditioner and may be used in place of the rolls now utilized by such machines. Hay conditioners being well known in the art, the construction thereof not forming any particular feature of the instant invention, has not been illustrated or described, since the invention will be readily understood by one skilled in the art and its manner of use readily comprehended.

For the purpose of illustration, a pair of wringer rolls A and B have been shown in the drawings. The roll A is the pickup roll and is lowermost and roll B is the cooperating companion roll which is shown in the drawings as being identical with the roll A and is located above the same. Due to the similarity of the rolls A and B, only roll A will be described in detail.

The wringer roll A comprises a core 11 of tubular construction and of a diameter somewhat less than the diameter of the roll proper. End members 12 and 13 are disposed one at each end of the core 11 and are identical in construction. Only end member 12 will be described in detail. This end member has a web 17 and a flange 14 extending inwardly from the outermost portion thereof and which is provided with a seat 15 snuggly received within the end of the core 11. The said end member is further formed with a shoulder 16 disposed outwardly of the core and adapted to engage the end of the core. This end member has a boss 18 concentric with the seat 15 and core 11. This boss has a bore 19 extending centrally through the same and coaxially with respect to the axis of the core 11. The outermost portion of the end member 12 is formed with a two-groove sheave 28.

Mounted on the core 11 are a number of wringer units 30a, 30b, 30c and 30d which are all substantially identical in construction. Only the wringer unit 30a adjacent the end member 12 will be described. This wringer unit consists of a sleeve 31 constructed of metal having rows 32 of longitudinally spaced circular openings 33. These openings are all the same size and the openings in adjoining rows are staggered. The sleeve 31 is of greater diameter than the core 11 to provide a space 34 therebetween. In conjunction with the sleeve 31, a rubber or similar flexible insert 35 is employed which is constructed with a backing 36 in sheet form. Issuing outwardly from this backing are a number of hammer heads 37 cylindrical in form and of a diameter slightly less than the diameter of the openings 33. The backing 36 is disposed in the space 34 between core 11 and sleeve 31 and is slightly smaller in internal diameter than the external diameter of the core. Formed in the backing 36 are a number of pockets 44 which are located in back of and between the various openings 33. These pockets extend through the inner surface 45 of said backing but falls short of the outer surface 46 thereof.

In the construction of each unit, the sleeve 31 is formed from sheet metal rolled into the proper form and welded together along the longitudinal marginal portions of the same parallel to the axis of the sleeve. The backing 36 and the hammer heads 37 are formed by casting the same with the backing in planiform shape. The insert 35 is first rolled together and then inserted into the said sleeve and allowed to expand. The various hammer heads are then forced through the openings 33 so that the same extend outwardly beyond the outer surface of the sleeve 31. The backing 36 of the insert 35 is of a width such that when the same is bent into circular form, the same fits snuggly within the interior of the sleeve 31 and the longitudinal edges 38 and 39 come together. When the insert is properly installed, the friction between the edges of the sleeve 31 at the openings 33 bear against the circumferential surfaces 139 of the hammer heads 37 and hold the inserts properly applied to the sleeve with the heads 37 extending outwardly beyond the outer surface of the sleeve 31. The backing 36 is of the same length as the sleeve 31.

To assemble the parts, the wringer units 30 are pressed on the core 11 until the ends 41 and 42 butt up against one another. The end 41 of the unit 30a adjacent the end member 12 extends substantially up to the shoulder 16 of said end member. Encircling the core 11 at the other end of the same is a ring spacer 43 which is disposed between the shoulder 16 of the end member 12 and the end 42 of unit 30d. The sum of the length of the units 30, plus the length of the spacer 43 is a trifle less than the length of the sleeve 11 so that the shoulders 16 rigidly clamp the end members 12 and 13 to the core. The roll B is constructed in the same manner as roll A except that the ring 43 is at the opposite end.

For supporting the roll A for rotating movement, a journal 20 is employed. This journal has a shank 21 coaxial with the axis of the wringer roll and which is snugly received within the bore 19 of end unit 12. This shank is of lesser diameter than the journal 20 to form a shoulder 22 which bears against the surface 23 of the end member 12. The journal 20 and shank 21 have a bore 24 extending completely through the same. Disposed within the bores 24 of the two journals 20 for the end members 12 and 13 is a rod 25. This rod is threaded at its ends to receive nuts 26 which bear against the end surfaces 27 of the journals 20 and which draw the end members 12 and 13 toward one another and against the ends of the core 11. The diameters of the journals 20 are such that the same will be properly received within the bores of the bearings, or bearing races of the bearings employed in the hay conditioner for journalling the rolls of the same.

By arranging the hammer heads 37 in adjoining rows in staggered relation and by means of the spacer 43, the heads are arranged so that the same partially overlie one another.

In actual use, the hammer heads 37 projecting outwardly beyond the sleeve 31 pick up the cut hay and elevate the same into the bight 47 formed between the two rolls A and B. The rolls A and B are preferably arranged so that the sleeves 31 of the same almost contact one another and create a crushing action on the hay as it passes through the rolls. As the hammer heads, due to their projection outwardly of the outer surface of the sleeve, enter the bight between rolls they strike the hammer heads on the companion roll or the outer surface of such roll and a contusion action on the cut hay occurs which compacts the pith in the stems so that when the sleeves engage the cut hay, the hay is crushed and the juices in the same squeezed out. The hay so prepared is subjected to subsequent evaporation to reduce the moisture content in the hay.

The advantages of the invention are manifest. The roll being formed in units, the units may be replaced when worn out or injured or the same may be shifted to positions of less wear without replacing the entire active surface. The construction shown will give confusing action as well as a crushing action to free the juices from the cut hay. The wringer rolls will pass objects such as corn cobs and pebbles without wrecking the rolls. With both end members being the same and with the crusher units being the same, the dealer needs only to stock a few parts to supply the demand for broken or worn parts. With the instant invention, less roll pressure is required than for the conventional type of hay conditioners. The rolls can be easily and readily manufactured at a nominal expense.

Changes in the specific form of the invention, as herein described, may be made within the scope of what is claimed without departing from the spirit of the invention.

I claim:
1. A hay conditioner roll comprising,
a tubular core,
end members engaging the ends of the core,
journal means carried by said end members and centered relative to said core thereby,
a number of separate annular wringer units mounted on said core in end to end relation and centered thereby,
certain of said wringer units comprising a metal sleeve encircling said core, and
resilient means carried by said sleeve and projecting outwardly beyond said sleeve to engage the hay directed thereto and
means for holding wringer units in place upon the core.

2. In a hay conditioner roll comprising a core, and journal means at the ends of the core, the combination of:
a number of separate annular wringer units mounted on said core in end to end relation and centered thereby,
certain of said wringer units comprising a metal sleeve encircling said core, and
of greater diameter than said core to form an annular space therebetween,
said sleeve having a plurality of openings therein disposed about the periphery thereof,
resilient hammer heads extending through said openings and normally projecting outwardly beyond said sleeve and
means disposed within said space and holding the hammer heads in operative positions.

3. In a hay conditioner roll comprising a core and journals at the ends of the core, the combination of:
an annular wringer unit mounted on said core and centered thereby
said wringer unit comprising a metal sleeve encircling said core, and
of greater diameter than said core to form an annular space therebetween,
said sleeve having a plurality of openings therein disposed about the periphery thereof,
resilient hammer heads extending through said openings and normally projecting outwardly beyond said sleeve and
means disposed within said space and integral with said hammer heads and holding said hammer heads in operative positions.

4. In a hay conditioner roll comprising a core and journals at the ends of the core, the combination of:
an annular wringer unit mounted on said core and centered thereby,
said wringer unit comprising a metal sleeve encircling said core, and
of greater diameter than said core to form an annular space therebetween,
said sleeve having a plurality of openings therein disposed about the periphery thereof,
resilient hammer heads extending through said openings and normally projecting outwardly beyond said sleeve and
a backing of flexible material disposed within said space and integral with said hammer heads and holding said hammer heads in operative positions.

5. In a hay conditioner roll comprising a core and journals at the ends of the core, the combination of:
an annular wringer unit mounted on said core and centered thereby
said wringer unit comprising a metal sleeve encircling said core, and
of greater diameter than said core to form an annular space therebetween,
said sleeve having a plurality of openings therein disposed about the periphery thereof,
said openings being arranged in staggered relation,
resilient hammer heads extending through said openings and normally projecting outwardly beyond said sleeve and
a sheet-like backing of flexible material disposed within said space and integral with said heads and holding said hammer heads in operative positions, and pockets in said backing disposed between said hammer heads and extending through the inner surface of said backing.

6. In a hay conditioner having a pair of wringer rolls each comprising a core, journals at the ends of the core, end members adjacent the ends of said core, said end members centering said journals relative to the core, the combination of:
- a number of separate annular wringer units mounted on each of said cores in end to end relation and centered thereby,
- resilient hammer heads disposed at the surface of said wringer units,
- said units being substantially identical and of the same length,
- a shoulder on one of said end members disposed adjacent the end of one of said hay conditioning units and engaging said core,
- a spacer between the shoulder of the corresponding end member of the other roll and the juxtaposed wringer unit to cause staggering of the heads on said rolls and
- means on each of said rolls for holding said wringer units in place upon said core.

7. In a hay conditioner having a pair of wringer rolls each comprising a core, journals at the ends of the core, end members adjacent the ends of said core, said end members centering said journals relative to the core, the combination of:
- a number of separate annular wringer units mounted on said core in end to end relation and centered thereby,
- resilient hammer heads disposed at the surface of said wringer units,
- said units being substantially identical and of the same length,
- a shoulder on one of said end members disposed adjacent the end of one of said hay conditioning units and engaging said core,
- a ring between the face of the corresponding end member of the other roll and the juxtaposed wringer unit to cause staggering of the hammer heads on said rolls and
- means for holding wringer units in place upon the core.

References Cited in the file of this patent

UNITED STATES PATENTS

| | | |
|---|---|---|
| 2,811,819 | Heth | Nov. 5, 1957 |
| 2,829,481 | Jarvis | Apr. 8, 1958 |